United States Patent [19]
Kanehira et al.

[11] Patent Number: 5,163,281
[45] Date of Patent: Nov. 17, 1992

[54] TRANSPARENT CABLE DRAG CHAIN

[75] Inventors: Makoto Kanehira, Hirakata; Yasumasa Tsubakimoto, Osaka, both of Japan

[73] Assignees: Tsubakimoto Chain Co.; Tsubakimoto Machinery and Engineering Co., both of Osaka, Japan

[21] Appl. No.: 846,788

[22] Filed: Mar. 4, 1992

[51] Int. Cl.⁵ .............................................. F16G 13/16
[52] U.S. Cl. ....................................... 59/78.1; 59/900; 248/49
[58] Field of Search .................. 59/78.1, 900; 248/48, 248/49, 50, 51, 78

[56] References Cited

U.S. PATENT DOCUMENTS

| | | | |
|---|---|---|---|
| 4,570,437 | 2/1986 | Moritz | 59/78.1 |
| 4,625,507 | 12/1986 | Moritz et al. | 59/78.1 |
| 4,651,944 | 3/1987 | Bader, Jr. | 242/55 |
| 4,658,577 | 4/1987 | Klein | 59/78.1 |
| 4,833,876 | 5/1989 | Kitao et al. | 59/78.1 |

FOREIGN PATENT DOCUMENTS 0286442 10/1988 European Pat. Off. ............ 59/78.1

Primary Examiner—David Jones
Attorney, Agent, or Firm—Howson & Howson

[57] ABSTRACT

A cable drag chain including a series of hollow links for guiding and protecting cables, hoses or the like conduits, the conduits being connected between a stationary power supply and a movable machine member. Each link includes a pair of opposite link plates connected in parallel relation between upper and lower coupling bars made of a transparent synthetic resin to enable defects in the conduits to be seen from outside the cable.

1 Claim, 2 Drawing Sheets

TRANSPARENT CABLE DRAG CHAIN

BRIEF SUMMARY OF THE INVENTION

This invention relates generally to cable carrier chains or cable drag chains, and more particularly to an improved cable drag chain suitable for supporting and protecting electric cables, hydraulic hoses or like flexible conduits connected at one end to a stationary power supply and at the other end to a movable member for conducting power thereto.

Flexible cables and hoses supplying electric or hydraulic power from a stationary supply to a movable part of a machine are usually confined within a cable carrier chain or so-called cable drag chain to prevent entanglement and abrasion with one another and with other parts of the machine. The chain is flexible in only one plane so that it can turn along its length in a shifting arcuate section as one end of the chain follows the movable part and the other end remains stationary.

Along straight sections extending from either end of the arcuate section, the conduits usually stay aligned in good order, but they may interfere with each other in the arcuate section. That is, conduits located near the outer perimeter of the arc tighten and shift radially inward, while those located near the inner perimeter slacken and shift radially outward. Consequently, the conduits may cross each other, and friction may cause them to deteriorate and eventually break.

Unfortunately, conventional cable drag chains are made of opaque metal or plastic materials which conceal the conduits, making it difficult to locate, and diagnose quickly, any deterioration or breakage. Unnecessary time and manpower are therefore consumed before the machine operation can be resumed. Preventive maintenance checks are also impeded for the same reason - inability to view the conduits while in place.

Accordingly, it is an object of the present invention to provide a novel and improved cable drag chain constructed in a manner which enables an operator continuously to observe cables or hoses while in place within the chain for possible entanglement, deterioration or other defects.

Another object is to provide a cable drag chain which enables any deterioration or breakage of hoses or cables within the conduit to be quickly located and remedied.

Still another object is to provide an improved, flexible cable drag chain which retains all the attributes of conventional cable carriers while providing visibility from outside of the conduits over substantially the entire length of the chain.

Briefly, these and other objects of the invention are accomplished by a cable drag chain having a series of links forming a flexible guide for supporting and protecting cables, hoses or the like connected between two members movable relative to each other. Each link includes a pair of opposite link plates connected in parallel relation between transparent upper and lower coupling bars. Thus, conduits within the chain may be visually inspected from without.

A more complete appreciation of the invention and many of its attendant advantage will become readily apparent and better understood by reference to the following detailed description taken in conjunction with the accompanying drawings.

DETAILED DESCRIPTION

Figure 1:
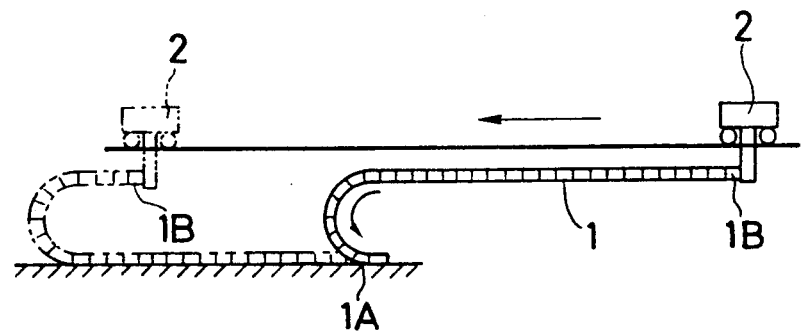
FIG. 1 is a schematic side elevation of a machine employing a transparent cable drag chain according to the invention.

Turning now to the drawings wherein like reference characters designate like or corresponding parts throughout the several views, FIG. 1 shows a cable drag chain 1 according to the invention for carrying conduits, not shown, to transmit energy from a stationary power supply to a movable machine member 2. The chain and machine member are shown in solid lines in a first position and in broken outline when moved in the direction of the arrow to a second position. Chain 1 includes a straight section extending from an end 1A fixed to a support structure of the power supply, and an arcuate section curving upwardly to another straight section which extends from the top of the arcuate section to machine member 2. As body 2 moves between the two positions, the arcuate section, and any conduits therewithin, progressively shift along the length of chain 1.

Figure 2:
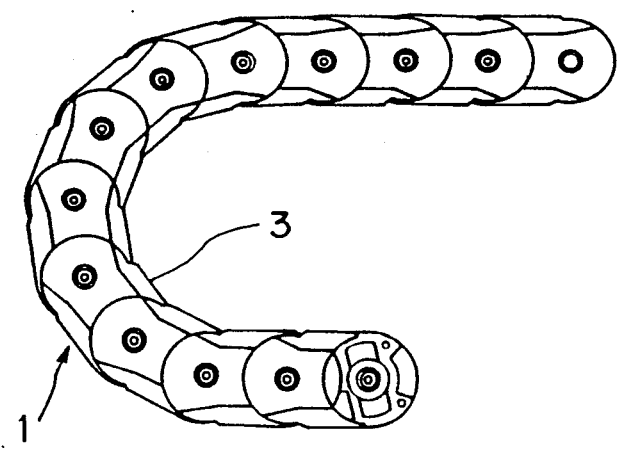
FIG. 2 is an enlarged elevational view of an arcuate section of the chain of FIG. 1 showing the inside faces of a link plate in the chain.

Referring to FIG. 2, cable drag chain 1 includes a plurality of chain link bodies 3 constructed in a manner permitting paired link plates to be opened and closed for replacing links or for inspecting or repairing conduits such as disclosed in U.S. Pat. No. 4,833,876 to Kitao et al.

Figure 3:
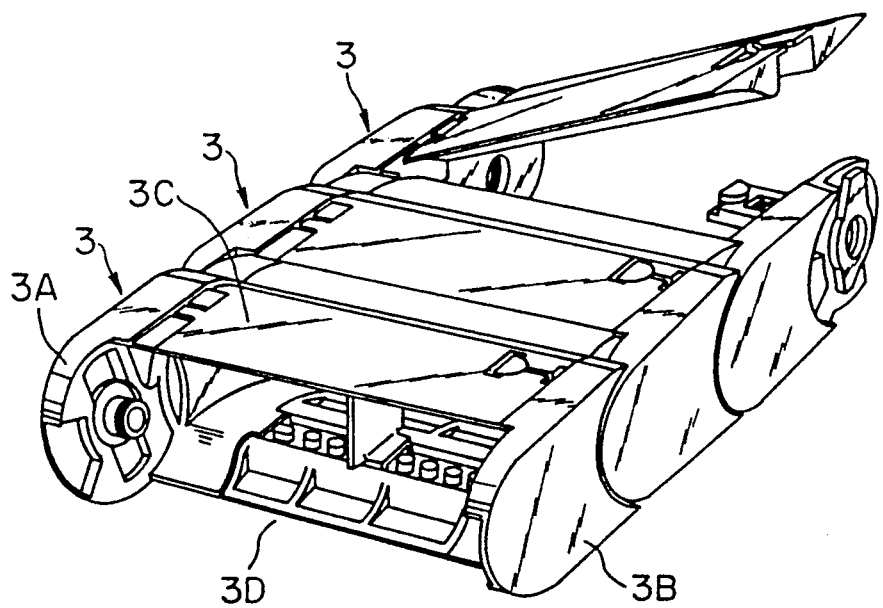
FIG. 3 is an enlarged perspective view of several links of the chain in FIG. 1 with one of the links partly unassembled.

Referring now to FIG. 3, each link body 3 of chain 1 includes a pair of opposite link plates 3A and 3B maintained in spaced relation by upper and lower coupling bars 3C and 3D respectively. With this arrangement, each link body defines in cross-section a hollow rectangular interior. Link bodies 3 are pivotally connected in series to form a fully enclosed flexible tube through which the conduits may run between the power supply at chain end IA and movable body 2 at the opposite chain end IB, as shown in FIG. 1. Coupling bars 3C and 3D are made of a transparent material such as a synthetic resin for enabling visual access to conduits from the outside of chain 1.

The practical effect brought on by this novel improvement is remarkable. Conduits which deteriorate or break due to entanglement or interference with each other under continuous flexure of the chain are immediately observable so that preventive measures can be taken. Consequently, machine operations can be continued with very little interruption.

It will be understood that other changes in the details, steps and arrangement of parts, which have been herein described and illustrated in order to explain the nature of the invention, may be made by those skilled in the art within the principle and scope of the invention as defined in the following claim.

We claim:

1. A transparent cable drag chain comprising a plurality of link bodies flexibly connected together, each of said link bodies having a passage extending therethrough, said connected link bodies together forming a continuous hollow passage, and said chain being connectible at one end to a fixed element and at the other end to a movable body, said chain being capable of enclosing a cable or hose extending through said continuous hollow passage, wherein each link body consists, at least in part, of transparent synthetic resin, whereby the condition of the cable or hose within the continuous hollow passage can be visually observed.

* * * * *